United States Patent
Kondo et al.

(10) Patent No.: US 7,299,308 B2
(45) Date of Patent: Nov. 20, 2007

(54) DATA TRANSMISSION APPARATUS AND ELECTRONIC CONTROL UNIT

(75) Inventors: Haruhiko Kondo, Kasugai (JP); Hirokazu Komori, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/372,172

(22) Filed: Feb. 25, 2003

(65) Prior Publication Data
US 2003/0200366 A1   Oct. 23, 2003

(30) Foreign Application Priority Data
Apr. 19, 2002   (JP)   ............... 2002-117858

(51) Int. Cl.
*G06F 7/00*   (2006.01)
*G06F 17/00*   (2006.01)
*G06F 19/00*   (2006.01)

(52) U.S. Cl. ............... 710/52; 710/6; 710/29; 710/36; 710/45; 710/53; 710/58; 710/310; 718/102; 701/29; 701/36; 701/48; 701/49; 701/102

(58) Field of Classification Search ............ 710/52–54, 710/56, 6, 25, 28, 29, 36, 39, 40, 45, 58, 710/60, 61, 107, 112, 310; 718/102, 103, 718/107; 701/29, 33, 36, 48, 49, 102, 115
See application file for complete search history.

(56) References Cited

U.S. PATENT DOCUMENTS

| | | | |
|---|---|---|---|
| 3,781,818 A * | 12/1973 | Pardoe et al. ............... 370/538 |
| 4,099,028 A * | 7/1978 | Towson, IV ................. 370/479 |
| 4,866,597 A | 9/1989 | Kinoshita |
| 5,235,693 A * | 8/1993 | Chinnaswamy et al. ..... 711/159 |
| 5,455,920 A * | 10/1995 | Muramatsu .................. 709/215 |
| 5,570,347 A * | 10/1996 | Bestler et al. .............. 370/461 |
| 5,699,250 A * | 12/1997 | Kobayashi ................... 701/48 |
| 5,794,244 A * | 8/1998 | Brosch et al. .............. 707/100 |
| 5,832,397 A * | 11/1998 | Yoshida et al. ............... 701/29 |
| 6,208,930 B1 * | 3/2001 | Uematsu ..................... 701/110 |
| 6,374,161 B1 * | 4/2002 | Iwai et al. ..................... 701/1 |
| 6,561,428 B2 * | 5/2003 | Meier et al. ........... 235/462.25 |
| 6,671,565 B1 * | 12/2003 | Kobayashi .................... 700/75 |
| 6,704,799 B1 * | 3/2004 | Kindorf et al. ............. 719/312 |
| 2002/0078257 A1 * | 6/2002 | Nishimura .................. 709/318 |

FOREIGN PATENT DOCUMENTS

EP   1034982 A2 *   9/2000

(Continued)

*Primary Examiner*—Tanh Q Nguyen
(74) *Attorney, Agent, or Firm*—Nixon & Vanderhye P.C.

(57) ABSTRACT

An electronic control unit has two microcomputers. Each microcomputer has a data buffer storing data first to be transmitted in every 8 ms, a second data buffer storing data to be transmitted in every 16 ms, and a third data buffer storing data to be transmitted in every 16 ms and being different from the first and second data buffers. The microcomputer transfers at the transmission timing of every 8 ms data in the first data buffer to the transmitting buffer, while it transfers alternately the data in the second data buffer and the data in the third data buffer to the transmitting buffer. The microcomputer also transfers an ID that indicates content of the present transmitting data to the transmitting buffer.

12 Claims, 6 Drawing Sheets

| 8ms TIMING \ DATA BUFFER | 8ms 31 (i=0) | 16ms-A 32 (i=1) | 16ms-B 33 (i=2) | 32ms-A 34 (i=3) | 32ms-B 35 (i=4) | |
|---|---|---|---|---|---|---|
| A (ID=0) | 1 | 1 | 0 | 1 | 0 | (Cnt=0) |
| B (ID=1) | 1 | 0 | 1 | 0 | 1 | (Cnt=1) |
| C (ID=2) | 1 | 1 | 0 | 0 | 0 | (Cnt=2) |
| D (ID=3) | 1 | 0 | 1 | 0 | 0 | (Cnt=3) |

FOREIGN PATENT DOCUMENTS

| | | |
|---|---|---|
| JP | 6-030472 | 2/1994 |
| JP | 7-135686 | 5/1995 |
| JP | 08-204756 | 8/1996 |
| JP | 9-050421 | 2/1997 |
| JP | 09-326779 | 12/1997 |

\* cited by examiner

| 8ms TIMING \ DATA BUFFER | 8ms 31 (i=0) | 16ms-A 32 (i=1) | 16ms-B 33 (i=2) | 32ms-A 34 (i=3) | 32ms-B 35 (i=4) | |
|---|---|---|---|---|---|---|
| A (ID=0) | 1 | 1 | 0 | 1 | 0 | (Cnt=0) |
| B (ID=1) | 1 | 0 | 1 | 0 | 1 | (Cnt=1) |
| C (ID=2) | 1 | 1 | 0 | 0 | 0 | (Cnt=2) |
| D (ID=3) | 1 | 0 | 1 | 0 | 0 | (Cnt=3) |

FIG. 7
| 8ms TIMING \ DATA BUFFER | 8ms 31 (i=0) | 16ms-A 32 (i=1) | 16ms-B 33 (i=2) | 32ms-A 34 (i=3) | 32ms-B 35 (i=4) | 32ms-C 36 (i=5) |
|---|---|---|---|---|---|---|
| A (ID=0) | 1 | 1 | 0 | 1 | 0 | 0 |
| B (ID=1) | 1 | 0 | 1 | 0 | 1 | 0 |
| C (ID=2) | 1 | 1 | 0 | 0 | 0 | 1 |
| D (ID=3) | 1 | 0 | 1 | 0 | 0 | 0 |
FIG. 8A  RELATED ART
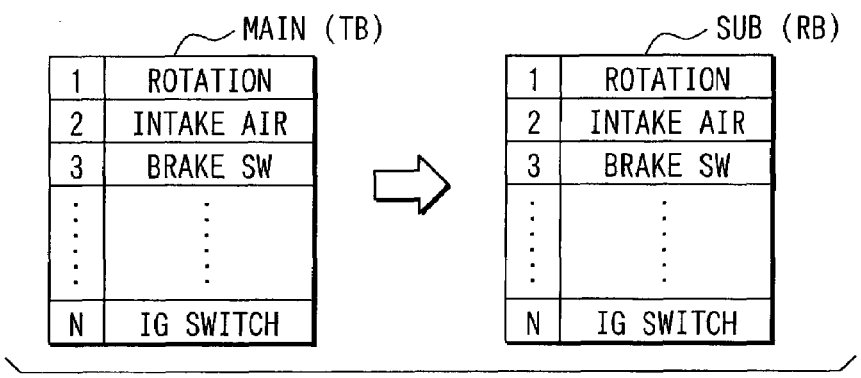
FIG. 8B  RELATED ART
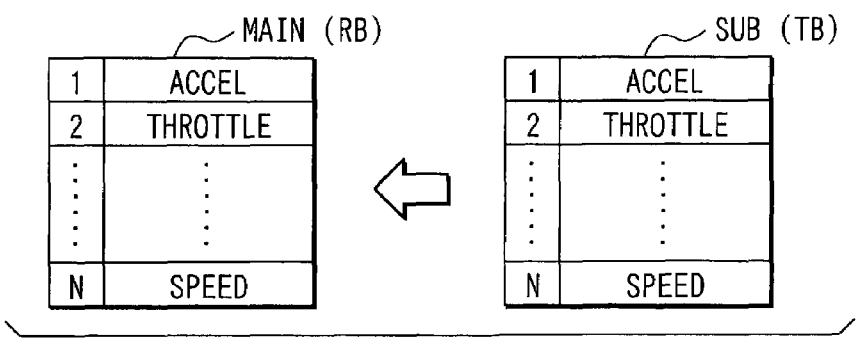

DATA TRANSMISSION APPARATUS AND ELECTRONIC CONTROL UNIT

CROSS REFERENCE TO RELATED APPLICATION

This application is based on and incorporates herein by reference Japanese Patent Application No. 2002-117858 filed on Apr. 19, 2002.

SUMMARY OF THE INVENTION

The present invention relates to data communication.

BACKGROUND OF THE INVENTION

In an electronic control unit (ECU) for controlling an engine of automobile, a plurality of microcomputers is used. In such an ECU, a plurality of microcomputers executes processes for controlling objects assigned thereto while sending and receiving calculated control data through communication (microcomputer communication).

In the ECU of this type, each microcomputer transfers each data of every kind to be transmitted to the other microcomputers to its transmitting buffer in the predetermined sequence whenever it becomes the transmission timing of data. Here, a practical example is illustrated in FIGS. 8A and 8B. In this example, a main microcomputer and a sub-microcomputer respectively make two-way communications.

In the example of FIG. 8A, the main microcomputer transmits to the sub-microcomputer various data including number of engine rotations, amount of intake air, ON/OFF state of brake switch, ON/OFF state of IG (Ignition) switch, and the like.

Transmission sequence of all data is previously determined as follows. For example, the first data to be transmitted to the sub-microcomputer from the main microcomputer is the number of rotations, the second data is the amount of intake air and the third data is ON/OFF state of brake switch. The main microcomputer transfers all data to be transmitted to the sub-microcomputer to its transmitting buffer (TB) in the sequence described above whenever it becomes the transmission timing, and then transmits these data to the sub-microcomputer.

Therefore, a receiving buffer (RB) of the sub-microcomputer stores respective data in the sequence in which the data is transferred from the main microcomputer. Accordingly, the sub-microcomputer in the receiving side can identify the data from the sequence of data stored in the receiving buffer.

In the example of FIG. 8B, various data such as accelerator position, throttle position, vehicle speed and the like are transmitted from the sub-microcomputer. In regard to the data to be transmitted to the main microcomputer from the sub-microcomputer, transmission sequence of every data is also determined such that the first data is the accelerator position, second data is the throttle position, etc. The sub-microcomputer, whenever it becomes the transmission timing, transmits all data to be transmitted to the main microcomputer to its transmitting buffer (TB) in the sequence described above, and then transmits these data to the main microcomputer.

Therefore, these data are stored in a receiving buffer (RB) of the main microcomputer in the sequence in which the sub-microcomputer transmits the data. From the sequence in which data are stored in the receiving buffer, the main microcomputer as a receiving side can identify the data.

However, the above data transmission method is designed to perform transmission of all data that is to be transmitted every time it becomes the transmission timing. In a apparatus where communication is performed in every 8 ms, even data to be updated in every 32 ms has also been transmitted in every 8 ms. This means that the data to be transmitted in a longer transmission period, that is to say, data having the longer update period, are also transmitted in the same period as the data having the shorter update period. Accordingly, the method suffers from unnecessary period, confronting with difficulty in increasing the number of data to be transmitted.

To cope with this problem, a method is considered that permits data transmission corresponding to various transmission timings by providing plural transmission timings therein. Specifically, assuming the apparatus in which communication is performed in every 8 ms, the data updated in every 32 ms is transmitted once in every four transmission timings having an interval of 8 ms (that is, in the transmission timing of every 32 ms).

This transmission method is considered to need a program that controls all data to be transmitted with respect to which data should be transmitted and at which timing it should be transmitted. However, this method results in complication of data transmission process. Moreover, it is difficult to execute readily addition, deletion of data as the transmission object, and change of transmission timing.

Specifically, in this case, its process is as follows: the current transmission timing is determined among a plurality of timings such as 8 ms and 32 ms from the routine which is determined at the transmission timing and thereby the data to be transmitted in the determined transmission timing to the transmitting buffer by reading this data from a memory area thereof.

However, assuming that data d which has been transmitted at the transmission timing a is requested to be transmitted in another transmission timing b, a processing part that reads data d and transfers the data to the transmitting buffer needs to be deleted from the contents of the program which is executed when this transmission timing is determined as the transmission timing a. Then another processing part that reads data d and transfers the data to the transmitting buffer needs to be added into the contents of the program which is executed when this transmission timing is determined as the transmission timing b. Thus, the program must be revised in many parts and points.

Therefore, an object of the present invention is to easily simplify a process for data transmission and to easily realize addition, deletion of data as the transmission object and change of transmission timing.

A data transmission apparatus according to the present invention transfers, at transmission timing, data to be transmitted in this transmission timing among a plurality of data to a transmitting buffer, and then transmits the data stored in this transmitting buffer to other apparatuses. This transmission apparatus is provided with a plurality of data buffers, for a plurality of transmission timings, to which data to be transmitted in such transmission timings are stored. Moreover, in this transmission apparatus, a data buffer in which the data to be transmitted in the inputted transmission timing is stored is identified from the data buffers for the transmission timings and the data stored in the identified data buffer is then transmitted to the transmitting buffer.

This transmission apparatus provides the following advantages.

(1) Addition and deletion of data as the transmission object and change of transmission timing can be realized only by changing contents of data buffers provided for respective transmission timings (which data shall be stored to which data buffer). Particularly, when transmission timing of a certain data d is requested to be changed, such request can be satisfied only by changing destination of write operation of data d in the manner that the calculation program for obtaining data d writes such data d to the data buffer corresponding to the transmission timing b after the above change in place of the data buffer corresponding to the transmission timing a before the above change.

(2) Data transmission process can be simplified because the data as transmission object is processed in unit of data buffer. Namely, each data as the transmission object is not required to be checked individually whether it is transmitted in the present transmission timing or not and since such transmission object data can be processed simultaneously for every data buffer, the data transmission can be processed effectively.

(3) Since only the data to be transmitted in each transmission timing is transmitted, transmission efficiency is high and the number of data to be transmitted can be increased easily.

In an electronic control unit of the present invention, a plurality of microcomputers executes the process to control the control object while data communication is performed. Particularly the microcomputers in the transmitting side to transmit data among a plurality of microcomputers are respectively provided with data buffers storing data to be transmitted for the specified transmission timing of a plurality of transmission timings. Moreover, the microcomputers in the transmitting side identifies, at every transmission timing, the data buffer storing the data to be transmitted at the transmission timing among the data buffers for respective transmission timings and transmits the data in the identified data buffer to the other microcomputers.

In the case of the electronic control unit wherein data can be transmitted from each one of a plurality of microcomputers, it is effective to apply the configuration of microcomputers in the transmitting side for all microcomputers, but it is also possible to apply the configuration of microcomputers in the transmitting side only to a part of the microcomputers.

BRIEF DESCRIPTION OF THE DRAWINGS

The above and other objects, features and advantages of the present invention will become more apparent from the following detailed description made with reference to the accompanying drawings. In the drawings:

FIG. 7 is a diagram illustrating operations of the second embodiment; and

FIGS. 8A and 8B are diagrams illustrating a related art.

DETAILED DESCRIPTION OF THE PREFERRED EMBODIMENT

First Embodiment

Figure 1:
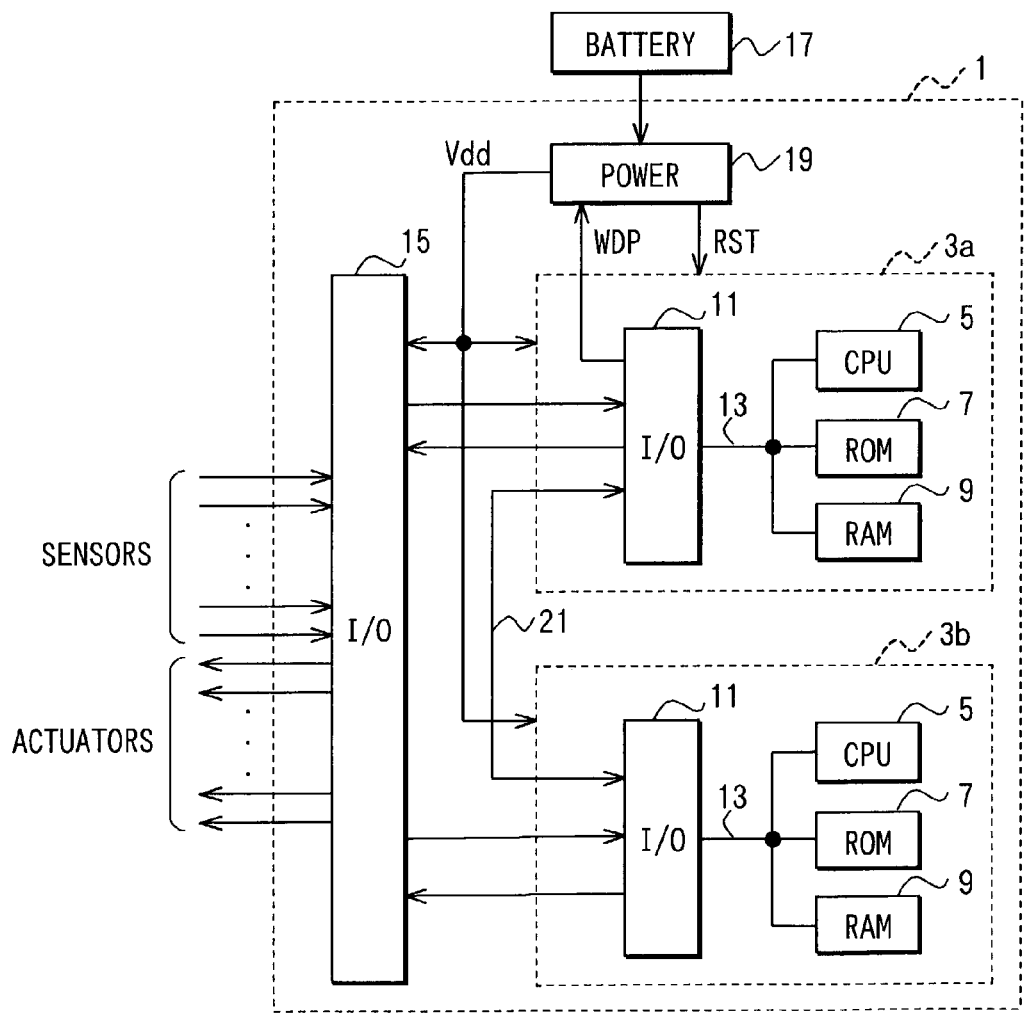
FIG. 1 is a block diagram illustrating an electronic control unit according to a first embodiment of the present invention.

Referring first to FIG. 1, an electronic control unit (ECU) 1 is provided to control an engine of an automobile and is provided with two microcomputers $3a$, $3b$. Each of the microcomputers $3a$, $3b$ comprises a CPU 5 for executing a program, a ROM 7 for storing the program executed by the CPU 5 and fixed data which is referred when the program is executed, a RAM 9 for storing the data calculated by the CPU 5, an I/O interface 11 for inputting and outputting data from and to external circuits, and a bustep 13 connecting these elements.

The ECU 1 is further provided with an input/output circuit 15 for inputting to the microcomputers $3a$, $3b$ the signals from various sensors (crank angle sensor, intake air sensor and the like) and various switches (brake switch, ignition switch and the like) provided for detecting the operating condition of the engine and for outputting drive signals to various actuators such as an injector and a motor for adjusting throttle position depending on commands from the microcomputers $3a$, $3b$. The ECU 1 is further provided with a power supply IC 19 for supplying a constant power source voltage Vdd to the microcomputers $3a$, $3b$ and the input/output circuit 15 by receiving an electrical power from a battery 17 of the vehicle.

In the ECU 1, the microcomputers $3a$, $3b$ are connected with a communication line 21. The communication line 21 includes specifically a data transmission line to the microcomputer $3b$ from the microcomputer $3a$, a data transmission line to the microcomputer $3a$ from the microcomputer $3b$ and a clock line for common use of clock for data transmission and reception by the microcomputers $3a$, $3b$. Meanwhile, the power supply IC 19 is provided with a watched-dog timer function (uncontrolled operation monitoring function) for outputting a reset signal RST to the microcomputer $3a$ when a watched-dog pulse WDP is not outputted within every predetermined time from the microcomputer $3a$. Moreover, whether the microcomputer $3b$ is operated normally or not can be monitored by the microcomputer $3a$.

In the ECU 1, two microcomputers $3a$, $3b$ execute the processes for controlling the control objects assigned thereto while sending and receiving each other the data obtained respectively via the communication line 21. For example, the data including the number of rotations of an engine, amount of intake air, ON/OFF state of a brake switch and ON/OFF state of an IG switch is periodically transmitted to the microcomputer $3b$ from the microcomputer $3a$. The data including accelerator position, throttle position and vehicle speed is periodically transmitted to the microcomputer $3a$ from the microcomputer $3b$.

The microcomputer $3a$ executes the processes to control a fuel injector and an ignition device (namely, for controlling fuel injection and ignition timing) based on the data obtained by itself and data received from the microcomputer $3b$. The microcomputer $3b$ executes the processes for controlling a motor for adjusting the throttle position based on the data obtained by itself and data received from the microcomputer $3a$.

Data transmission to the microcomputer 3b from the microcomputer 3a will be described below. Data transmission to the microcomputer 3b from the microcomputer 3a can also be realized in the same manner.

Figure 2:
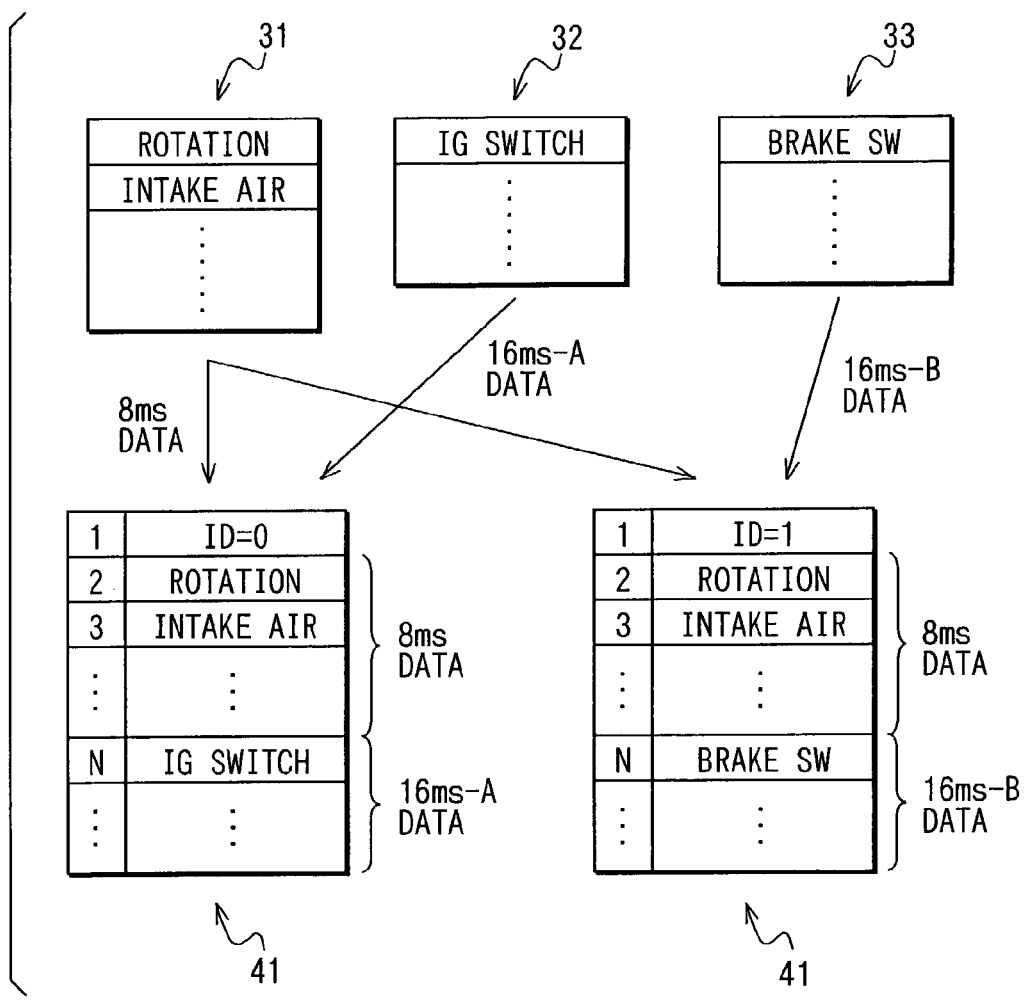
FIG. 2 is a diagram illustrating data buffers and transmitting buffers provided in a microcomputer in the first embodiment and the relationship between the buffers.

First, as illustrated in FIG. 2, the RAM 9 of the microcomputer 3a has the areas for a data buffer 31 to store the data to be transmitted in every 8 ms (8 ms data buffer), two data buffers 32, 33 to store the data to be transmitted in every 16 ms, and a transmitting data buffer 41 to store the data (transmitting data) transmitted to a communication partner (the microcomputer 3b).

The microcomputer 3a transmits the data in the transmitting buffer 41 to the microcomputer 3b by transferring the data to be transmitted in the timing of every 8 ms to the transmitting buffer 41 and the data stored in the 8 ms data buffer 31 is transmitted every time (namely, whenever it becomes the transmission timing in every 8 ms). Moreover, the data stored in the data buffer 32 and the data stored in the data buffer 33 are alternately transmitted.

Namely, the transmission interval of data stored in the data buffer 32 and the transmission interval of data stored in the data buffer 33 are both 16 ms but these intervals are differentiated from each other by 8 ms in their transmission timings. Therefore, the data buffer 32 is referred to as a 16 ms-A data buffer 32, while the data buffer 33 as a 16 ms-B data buffer 33. Moreover, the timing for transmitting data in the 16 ms-A data buffer 32 is defined as the 8 ms timing <1>, while the timing for transmitting data in the 16 ms-B data buffer 33 is defined as the 8 ms timing <2>.

Therefore, the microcomputer 3a transmits, in the 8 ms timing <1>, the data in the 8 ms data buffer 31 (8 ms data) and the data in the 16 ms-A data buffer 32 (16 ms-A data) to the transmitting buffer 41, and then transmits these data to the microcomputer 3b. The microcomputer 3a further transfers, in the 8 sm timing <2> as the next transmission timing, the 8 ms data and the data in the 16 ms-B data buffer 33 (16 ms-B data) to the transmitting buffer 41 and then transmits these data to the microcomputer 3b.

Moreover, the microcomputer 3a transfers, to the beginning position of the transmitting buffer 41, an ID (corresponding to data of identification information) indicating contents of the data to be transmitted this time (namely, the transmitting data format indicating the location of data in the transmitting data). Therefore, the ID is also transmitted to the microcomputer 3b of the transmission partner together with the usual transmission data. Thus the microcomputer 3b can detect contents of data received this time from the ID thereof.

In this embodiment, the data which is updated in every 8 ms such as the number of rotations of engine and amount of intake air among those calculated by the calculation program in the microcomputer 3a are stored in the 8 ms data buffer 31. The data which are updated in every 16 ms such as ON/OFF state of IG switch and ON/OFF state of brake switch are almost equally shared and stored in the 16 ms-A data buffer 32 and 16 ms-B data buffer 33.

Figure 3:
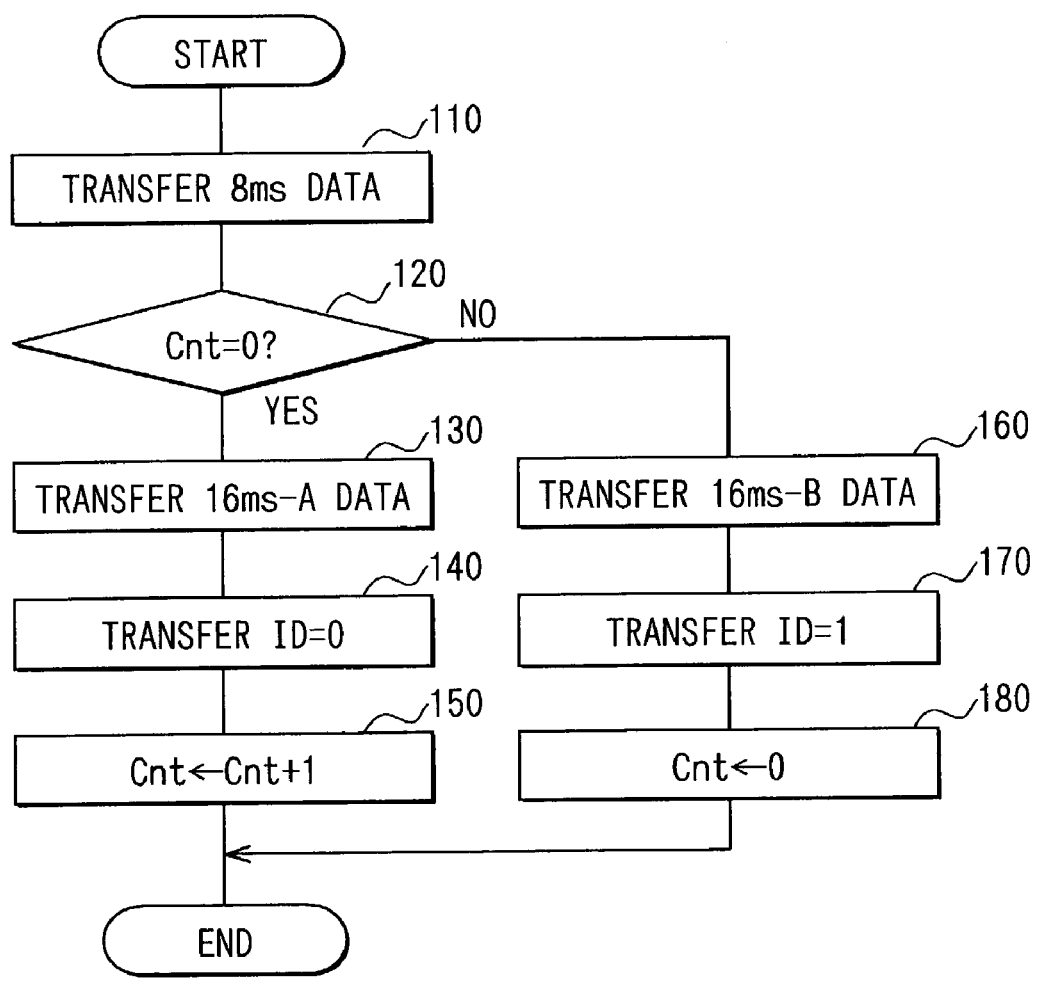
FIG. 3 is a flowchart illustrating transmitting data processes to be executed in the first embodiment.

Specifically, the CPU 5 of the microcomputer 3a performs operations of FIG. 2 based on a program illustrated as a flowchart in FIG. 3. The data transmission is processed at every transmission timing of 8 ms.

As illustrated in FIG. 3, when the CPU 5 of microcomputer 3a starts to process the data transmission, contents of the 8 ms data buffer 21 (namely, 8 ms data) are transferred to the transmitting buffer 41 in step 110, and whether a count Cnt of a counter is 0 or not is determined in the following step 120. The counter is provided to determine whether the present transmission timing is 8 ms timing<1> or 8 ms timing<2>, and a value of this transmission timing is initialized to 0 when the microcomputer 3a has started its operation.

When the count Cnt of the counter is determined as 0 in step 120, the present transmission timing is determined as 8 ms timing<1> and content of the 16 ms-A data buffer (namely, 16 ms-A data) is transferred to the transmitting buffer 41 in step 130. Next, in step 140, a value of ID is set to 0, and this ID (=0) is transferred to the leading position of the transmitting buffer 41. Subsequently, in step 150, the count Cnt of the counter is incremented by one (+1), and thereafter process of the relevant transmission data is completed. Accordingly, data in the transmitting buffer 41 is transmitted to the microcomputer 3b with the transmission process (not illustrated).

Meanwhile, when it is determined that the count Cnt of the counter is not 0 in step 120, the present transmission timing is determined as 8 ms timing<2> and content of 16 ms-B data buffer 33 (namely 16 ms-B data) is transferred to the transmitting buffer 41. Next, a value of ID is set to 1 and this ID (=1) is transferred to the leading position of the transmitting buffer 41 in step 170. In the following step 180, the count Cnt of the counter is reset to 0 (initialized) and thereafter process of the relevant transmitting data is completed. Thereby, data in the transmitting buffer 41 is transmitted to the microcomputer 3b in the conventional manner.

With the data transmitting process described above, the ID having the value 0, 8 ms data and 16 ms-A data are collected in this sequence to the transmitting buffer 41 and then transmitted to the microcomputer 3b at the 8 ms timing<1> (namely, at one timing of two transmission timings of every 8 ms) On the other hand, the ID having the value 1, 8 ms data and 16 ms-B data are collected in this sequence to the transmitting buffer 41 and are then transmitted to the microcomputer 3b at the 8 ms timing<2> (namely, at one timing of two transmission timings of every 8 ms).

As described above, the microcomputers 3a, 3b in the ECU 1 of this embodiment are respectively provided, for each of a plurality of transmission timings, with data buffers 31, 32, 33 to which a plurality of data to be transmitted in respective transmission timings are stored. Therefore, the data to be transmitted to the communication partner in the same transmission timing are stored in the form of a block in the microcomputers 3a, 3b. Here, the microcomputers 3a, 3b identify in step 120, whenever the transmission timing of every 8 ms is inputted, the data buffer to which the data to be transmitted in the latest transmission timing is stored from the data buffers 31 to 33 for each transmission timing, and transfers the data in the identified data buffer to the transmitting buffer 41 and then transmits this data to the communication partner.

Therefore, according to the ECU 1 of this embodiment, the effects (1) to (3) described above can be attained. In the process of FIG. 3, a flag may be substituted for the counter Cnt. Moreover, three or more data buffers may also be used.

Second Embodiment

Figure 4:
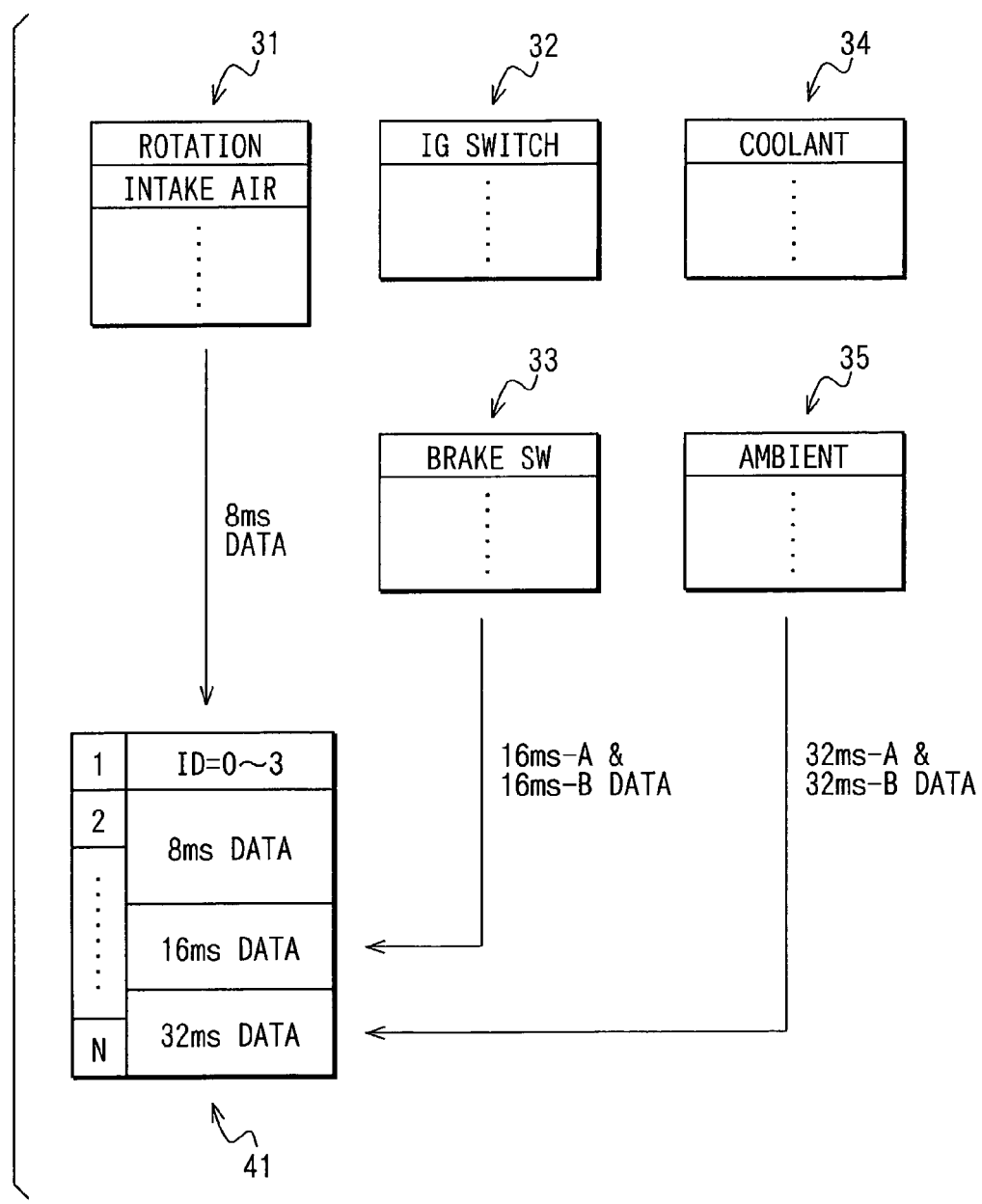
FIG. 4 is a diagram illustrating an example where five data buffers are provided according to a second embodiment of the present invention.
Figures 5, 6:
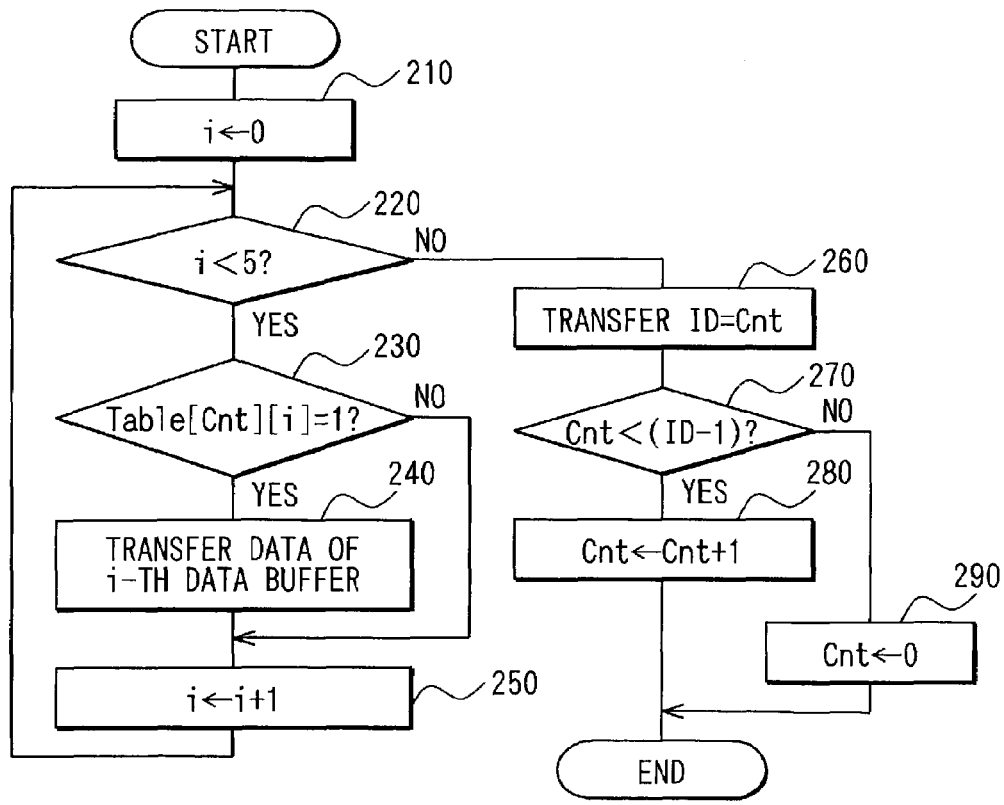
FIG. 5 is a diagram illustrating a definition table used in the second embodiment.
FIG. 6 is a flowchart illustrating transmitting data processes to be executed in the second embodiment.

In this embodiment, it is assumed that two data buffers 34, 35 to which the data to be transmitted in every 32 ms (the data which is updated in every 32 ms) is stored are added as shown in FIG. 5 in addition to the data buffers 31 to 33 in the microcomputer 3a as illustrated in FIG. 4. The data buffer 34 is referred to as the 32 ms-A data buffer, while the other data buffer 35 as the 32 ms-B data buffer.

In this case, the microcomputer 3a switches the data buffer as the transmission object (namely, the data buffer as the transmission object to send data to the transmitting buffer 41) in a manner, for example, that the data in the 32 ms-A data buffer 34 (32 ms-A data) is transferred to the transmitting buffer 41 in one transmission timing of two transmission timings for sending the 16 ms-A data, while the data in the 32 ms-B data buffer 35 (32 ms-B data) is transferred to the transmitting buffer 41 in one transmission timing of two transmission timings for sending the 16 ms-B data.

Accordingly, the 32 ms-A data and 32 ms-B data are transmitted to the microcomputer 3b of the communication partner in one different transmission timing of four transmission timings of every 8 ms. In this case, the data buffers as the transmission objects in the transmission timing of every 8 ms can be combined in the four kinds of "31+32+34", "31+33+35", "31+32" and "31+33" among the five data buffers 31 to 35.

In this case, the value of ID transferred to the leading position of the transmitting buffer 41 is set to any one of 0 to 3 depending on the four kinds of combination of data buffers as the transmission objects. Moreover, the area defined as "16 ms data" in the transmitting buffer 41 of FIG. 4 indicates that any one of the 16 ms-A data and 16 ms-B data is transferred thereto, while the area defined as "32 ms data" indicates that any one of the 32 ms-A data and 32 ms-B data is transferred thereto.

Meanwhile, even when five data buffers are provided as illustrated in FIG. 4, a program may be formed so that the data buffers as the transmission objects may be switched depending on the count of counter as in the case of the process in FIG. 3.

In the ECU 1 of the second embodiment, the RAM 9 of the microcomputer 3a is provided with five data buffers 31 to 35 as illustrated in FIG. 4 (in detail, each area as the data buffers 31 to 35).

Moreover, the ROM 7 of the microcomputer 3a is provided with an area as a table storage area. In this table storage area, a definition table as illustrated in FIG. 5 is stored to suggest that the data in which data buffer should be transmitted in which transmission timing (that is, which data buffer should be considered as the transmission object).

In other words, in this second embodiment, the transmission timing in every 8 ms is sorted to four timings of 8 ms timing A, 8 ms timing B, 8 ms timing C and 8 ms timing D depending on content of the transmitting data. The definition table is formed as the two-dimensional table indicating that the data buffers 31 to 35 which should be defined as the transmission object are provided for the 8 ms timings A to D. In more detail, in this definition table, first to fourth lines correspond to 8 ms timings A to D, while the first to fifth columns correspond to data buffers 31 to 35. In this table, "1" defines "transmission object". Therefore, since data of the first line in the definition table is "1, 1, 0, 1, 0", this data suggests that the 8 ms data buffer 31, 16 ms-A data buffer 32 and 32 ms-A data buffer 34 are set as the transmission object in the 8 ms timing A. Since data of the second line in the definition table is "1, 0, 1, 0, 1", this data suggests that the 8 ms data buffer 31, 16 ms-B data buffer 33 and 32 ms-B data buffer 35 are set as the transmission object in the 8 ms timing B.

Moreover, in the ECU 1 of the second embodiment, the CPU 5 of microcomputer 3a processes the data transmission illustrated in FIG. 6 in place of the process of FIG. 3. Thereby, the data buffer which should be considered as the transmission object in the present transmission timing is identified from the definition table and the data in the identified data buffer is transferred to the transmitting buffer 41.

In the process of transmitting data of FIG. 6 and the following description, the first line of definition table in FIG. 5 is defined as the line 0, while the first column of definition table is defined as the column 0. Moreover, in FIG. 6 and following description, Cnt is a variable indicating the number of lines of definition table, while i is a variable indicating the number of columns of definition table in FIG. 5. In addition, "Table[Cnt][i]" indicates a data value of the line Cnt and the column i of the definition table in FIG. 5. Moreover, a value of Cnt is initialized to 0 when the microcomputer 3a has started operation.

When the CPU 5 of microcomputer 3a starts execution of the data transmitting process as illustrated in FIG. 6, a value of i is initialized first to 0 in step 210. In the following step 220, whether the value of i is smaller than the number of data buffers (5 in this example) or not is determined.

Here, if the value of i is smaller than the number of data buffers (step 220: YES), whether a value of "Table[Cnt][i]" is 1 or not is determined by referring to the definition table in step 230. When the value is 1 (step 230: YES), data in the data buffer (namely the i-th data buffer corresponding to the column i) corresponding to the value of i in the definition table is transferred to the transmitting buffer 41 in step 240.

When the process of step 240 is executed or when it is determined that a value of "Table[Cnt][i]" is not 1 in step 230 (step 230: NO), the value of i is incremented by one (1) in step 250, and thereafter the process returns to step 220.

Meanwhile, when it is determined in step 220 that the value of i is not smaller than the number 5 of data buffers (namely, the value of i reaches the number of data buffers), the process shifts to step 260, upon determination that all data in the data buffers to be transmitted in the present transmission timing can be transferred to the transmitting buffer 41.

In this step 260, the value of ID is set to the value of the present Cnt and its ID is transferred to the leading position of the transmitting buffer 41.

Moreover, in the subsequent step 270, it is determined whether the value of Cnt is smaller than the value "Number of ID−1", or not. When the value of Cnt is smaller than "Number of ID" (step 270: YES), the value of Cnt is incremented by one (1), and thereafter process of the relevant transmitting data is terminated. In this timing, data in the transmitting buffer 41 is transmitted to the microcomputer 3b in the known manner.

In this second embodiment, the transmission timing in every 8 ms is sorted to for timings A to D depending on the content of transmitting data and the IDs of different values are given to the transmitting data in the timings A to D. In more detail, as illustrated in FIG. 5, the ID of transmitting data of 8 ms timing A is set to "0", the ID of transmitting data of 8 ms timing B is set to "1"n, the ID of transmitting data of 8 ms timing C is set to "2" and the ID of transmitting data of 8 ms timing D is set to "3". Therefore, in this embodiment, the number of IDs is four (4).

On the other hand, when it is determined in step 270 that the value of Cnt is not smaller than the value of "Number of ID —1" (step 270: NO), the value of Cnt is initialized to 0 in step 290. Thereafter, process of the relevant transmitting data is completed.

According to this transmitting data process (FIG. 6), the value of Cnt is repeatedly updated in such an order of 0, 1, 2, 3, 0, and 1 whenever the relevant process is executed with the processes in step 270 to step 290.

When the value of Cnt is M (where, M is any one of 0 to 3), the M-th line in the definition table of FIG. 5 is searched column by column up to the fourth column from the 0-th column and the data buffer corresponding to the column where the data value is 1 is identified as the data buffer to be the transmission object and data in this data buffer is transferred to the transmitting buffer 41. Thereafter, the value of ID is set to M with the process in the step 260 and is then transferred to the transmitting buffer 41.

Accordingly, when the value of Cnt is, for example, 0, the 0-th line corresponding to the 8 ms timing A in the definition table is searched column by column. Thereby, the 8 ms data buffer 31 corresponding to the column where the data value is 1, 16 ms-A data buffer 32 and 32 ms-A data buffer 34 are identified as the data buffer of the transmission object. As a result, data in the data buffers 31, 32, 34 are transferred to the transmitting buffer 41. In this case, moreover, the ID having the value 0 is transferred to the leading position of the transmitting buffer 41 with the process in the step 260.

In addition, when the value of Cnt is, for example, 3, the third line corresponding to the 8 ms timing D in the definition table is searched column by column. Thereby, the 8 ms data buffer 31 corresponding to the column where the data value is 1 and the 16 ms-B data buffer 33 are identified as the data buffer of the transmission object. As a result, data in the data buffers 31, 33 are transferred to the transmitting buffer 41. In this case, the ID having the value 3 is transferred to the leading position of the transmitting buffer 41 with the process in step 260.

According to the CPU of the second embodiment described above, even when content of process (process of transmitting data in FIG. 6) to be executed by the microcomputers 3a, 3b for data transmission is not changed, the data buffer storing the data to be transmitted and the transmission timing to transmit this data in the same data buffer may be updated only by changing content of the definition table. Moreover, addition and deletion of transmitting data in unit of data buffer can also be realized easily only by changing content of the definition table.

For example, when it is requested to change the apparatus to transmit a certain data (additional data) in the timing of every 32 ms which is different from the two transmission timings of the 32 ms-A data buffer 34 and 32 ms-B data buffer 35, it is possible to add a data buffer 36 (not shown) for storing such additional data (32 ms-C data buffer) is added and a fifth column corresponding to the 32 ms-C data buffer is provided additionally in the definition table as illustrated in FIG. 7. In this case, it is only required to change the number of data buffers to be compared with the value of i in step 220 of FIG. 6 to "6" from "5".

According to the process of transmitting data of the second embodiment, various changes may be covered even when content of process is not changed. Therefore, such process of transmitting data can also be applied to the other CPUs of different transmission object data and transmission schedule.

The preferred embodiments of the present invention have been described but the present invention, of course, allows various changes and modifications.

For example, in the process of transmitting data (FIG. 6) of the second embodiment, the value of Cnt is updated whenever the process of transmitting data is completed to switch the ID in every process. However, if such switching is not performed correctly, it is possible that the value of Cnt is decremented by one (1) (namely, not updated) and the data of the same ID is transmitted in the next transmission timing.

Moreover, in the above embodiments, it is also possible to provide a data buffer where the data to be transmitted in every 24 ms is stored and a data buffer where the data to be transmitted in every 40 ms is stored. Namely, it is possible to set the transmission period of each data buffer to any period that is equal to an integer times of the shortest transmission period (8 ms in above embodiments).

Meanwhile, in the above embodiments, the transmission apparatus of the present invention has been applied to communication between microcomputers in the ECUs, but the transmission apparatus of the present invention can also be applied in the same manner to communication between ECUs forming the LAN within the vehicle and communication between other apparatuses.

What is claimed is:

1. A data transmission apparatus comprising:
a transmitting buffer for transmitting a plurality of data to other apparatuses;
a plurality of data buffers storing the plurality of data to be transmitted at specified transmission timings among a plurality of different transmission timings;
a transmission process means identifying one of the plurality of data buffers storing data to be transmitted at a specified transmission timing from the plurality of data buffers, thereby to transfer the data in the identified data buffer to the transmitting buffer; and
a memory for storing at least a two-dimensional definition table that defines a relation between a first variable and a second variable, the first variable having values corresponding to data buffer identifiers of the plurality of data buffers storing the data to be transmitted and the second variable having values corresponding to the plurality of the specified transmission timings so that the transmission process means identifies the data buffer storing the data to be transmitted at the specified transmission timing based on the two-dimensional definition table;
wherein at least two of the plurality of data buffers have a same transmission interval, wherein the at least two of the plurality of data buffers store data to be transmitted at different transmission timings so that a transmission of a first data buffer of the at least two of the plurality of data buffers always begins non-simultaneously with a transmission of a second data buffer of the at least two of the plurality of data buffers, wherein the first data buffer stores data of a first type and the second data buffer stores data of a second type, wherein the first type is different from the second type,
wherein the second variable has values that correspond to specified transmission timings of integer times of a minimum transmission timing, and
wherein the data buffers having the same transmission interval are identified by the transmission process means by varying the first variable and the second variable.

2. The transmission apparatus according to claim 1,
wherein the transmission process means transfers to the transmitting buffer data of identification information indicating content of the data to be transmitted from the transmitting buffer.

3. An electronic control unit comprising:
a plurality of microcomputers for controlling control objects while performing data communications therebetween,
wherein the plurality of the microcomputers has a transmitting side microcomputer used for transmitting data and including a plurality of data buffers storing data to be transmitted at a plurality of specified transmission timings;

the transmitting side microcomputer identifies one of the data buffers storing the data to be transmitted from the plurality of data buffers thereby to transfer the data in the identified data buffer to a receiving side microcomputer;

the transmitting side microcomputer has a memory storing at least a two-dimensional definition table defining a relation between a first variable and a second variable, the first variable having values corresponding to data buffer identifiers of the data buffers and the second variable having values corresponding to the specified transmission timings;

the transmitting side microcomputer identifies the data buffer storing data to be transmitted at a specified transmission timing based on the relation between the first and second variables defined in the two-dimensional definition table;

wherein at least two of the plurality of data buffers have a same transmission interval, wherein the at least two of the plurality of data buffers store data to be transmitted at different transmission timings so that a transmission of a first data buffer of the at least two of the plurality of data buffers always begins non-simultaneously with a transmission of a second data buffer of the at least two of the plurality of data buffers, wherein the first data buffer stores data of a first type and the second data buffer stores data of a second type, wherein the first type is different from the second type;

wherein the second variable has values that correspond to specified transmission timings of integer times of a minimum transmission timing; and wherein the data buffers having the same transmission interval are identified by the transmitting side microcomputer by varying the first variable and the second variable.

4. The electronic control unit according to claim 3, wherein the transmitting side microcomputer transmits the data in the data buffer identified based on the two-dimensional definition table and identification information indicating content of data to be transmitted to the receiving side microcomputer.

5. The transmission apparatus according to claim 1, wherein:

the transmission process means identifies the data buffer at the specified transmission timing by using the first variable and the second variable.

6. The transmission apparatus according to claim 1, wherein:

the transmitting buffer, the data buffers, the transmission process means and the memory are mounted in a vehicle;

the memory for storing the two-dimensional definition table is a ROM; and the transmitting buffer and the data buffers are provided in a RAM.

7. The electronic control unit according to claim 3, wherein:

the transmitting side microcomputer identifies the data buffer at the specified transmission timing by using the first variable and the second variable.

8. The electronic control unit according to claim 3, wherein:

the plurality of microcomputers and the memory are mounted in a vehicle;

the memory for storing the two-dimensional definition table is a ROM; and the plurality of data buffers are provided in a RAM mounted in the vehicle.

9. The transmission apparatus according to claim 5, wherein the transmission process means specifies the one of the data buffers by varying the first variable.

10. The transmission apparatus according to claim 1, wherein the transmission process means specifies the one of the data buffers by varying the first variable.

11. The electronic control unit according to claim 7, wherein the transmitting side microcomputer specifies the one of the data buffers by varying the first variable.

12. The electronic control unit according to claim 3, wherein the transmitting side microcomputer specifies the one of the data buffers by varying the first variable.

* * * * *